United States Patent [19]

Antes

[11] Patent Number: 4,761,253
[45] Date of Patent: Aug. 2, 1988

[54] METHOD AND APPARATUS FOR PRODUCING A RELIEF PATTERN WITH A MICROSCOPIC STRUCTURE, IN PARTICULAR HAVING AN OPTICAL DIFFRACTION EFFECT

[75] Inventor: Gregor Antes, Zürich, Switzerland

[73] Assignee: LGZ Landis & Gyr Zug Ag, Zug, Switzerland

[21] Appl. No.: 14,096

[22] Filed: Jan. 29, 1987

Related U.S. Application Data

[63] Continuation of Ser. No. 750,550, Jul. 1, 1985, abandoned.

[30] Foreign Application Priority Data

Jul. 6, 1984 [CH] Switzerland .................. 3277/84

[51] Int. Cl.⁴ .................. B29D 11/00; B29D 59/02
[52] U.S. Cl. .................. 264/1.3; 264/1.4; 264/1.7; 264/2.7; 264/25; 264/40.1; 264/293; 425/150; 425/174.4; 425/385
[58] Field of Search .................. 264/1.3, 2.7, 284, 293, 264/1.4, 1.7, 25, 40.1; 425/174.4, 385, 150

[56] References Cited

U.S. PATENT DOCUMENTS 3,170,008  2/1965  Levine .................. 430/19
4,223,050  9/1980  Nyfeler et al. .................. 427/163

FOREIGN PATENT DOCUMENTS 1729040  11/1971  Fed. Rep. of Germany .
111820    6/1984   Japan .................. 264/1.4
1196535   9/1968   United Kingdom .

Primary Examiner—James Lowe
Attorney, Agent, or Firm—Marmorek, Guttman & Rubenstein

[57] ABSTRACT

A method and apparatus for embossing a pattern having a microscopic relief structure, such as, for example, an optical diffraction grating, onto a layer of thermoplastic material is disclosed. A small circular region of a flexible embossing die is pressed against the thermoplastic layer by means of a punch. A fraction of the corresponding small circular region of the thermoplastic layer is then heated from the rear by a beam of radiant energy. The process may be repeated at all points on the thermoplastic layer where the pattern is desired.

16 Claims, 1 Drawing Sheet

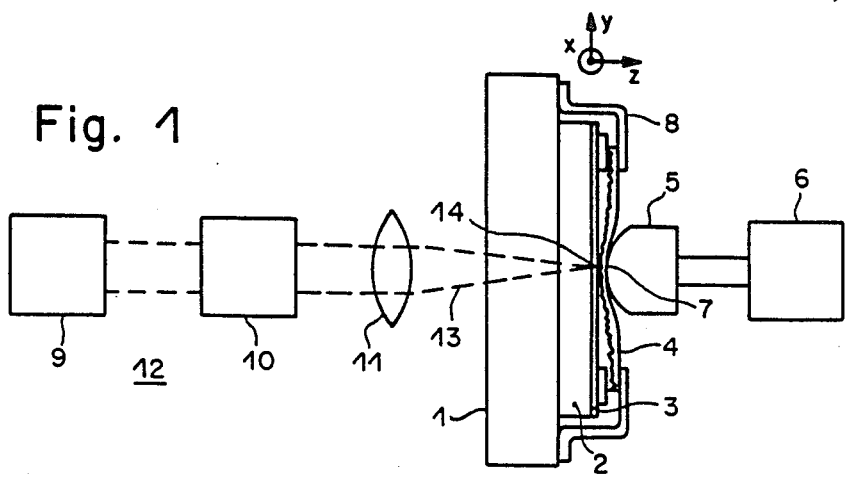
Fig. 1
Fig. 2  Fig. 3  Fig. 4
  
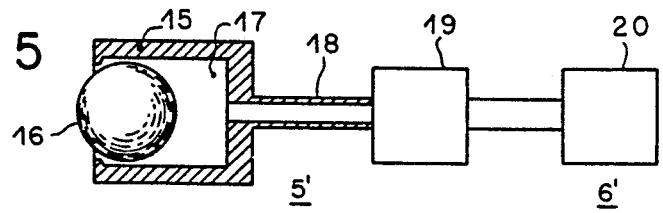
Fig. 5
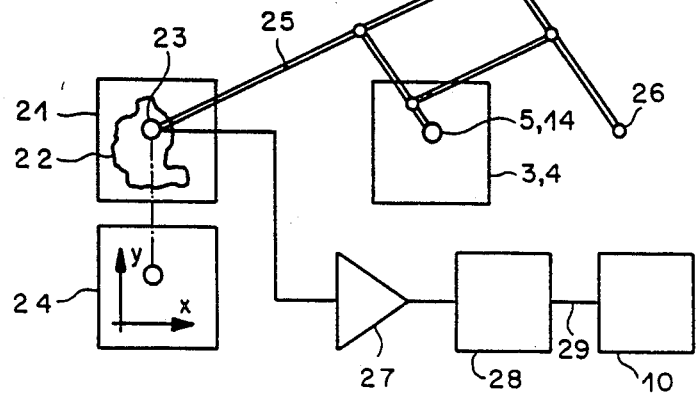
Fig. 6

METHOD AND APPARATUS FOR PRODUCING A RELIEF PATTERN WITH A MICROSCOPIC STRUCTURE, IN PARTICULAR HAVING AN OPTICAL DIFFRACTION EFFECT

This application is a continuation of prior U.S. application Ser. No. 750,550, filed July 1, 1985, and now abandoned.

FIELD OF THE INVENTION

The invention relates to a method of, and apparatus for, producing a relief pattern with a microscopic structure, such as an optical diffraction grating, on the surface of a thermoplastic medium.

BACKGROUND OF THE INVENTION

A relief pattern, with a microscopic structure, may be used for example as an optical diffraction security element on a document as described in EP-A-0 105 099), corresponding to the commonly owned U.S. application Ser. No. 534,201 (Gregor Antes), filed Sept. 21, 1983 now U.S. Pat. No. 4,568,141. The relief may be in the form of a geometrical figure, a number, a letter, an ornament, a guilloche, etc., and may be formed for example by stringing together a large number of relatively small optical-diffraction elements. Such relief patterns may be achieved by virtue of the fact that diffraction structures can be produced by interferometric superimposition of coherent light beams with different angles of incidence, which are converted by photolithographic means into the surface microprofile (EP-A-0 105 099). Fixed prefabricated optical masks can be used for geometrically defining the areas to be exposed to light. If the relief pattern to be produced and its microscopic structure exceed a given degree of graphic and structural complexity, the mask procedure is found to be prohibitively expensive. In addition, optical-diffraction structural elements with an asymmetrical profile, for example sawtooth configurations, cannot be produced by the above-mentioned interferometric method.

Structures exhibiting an optical diffraction effect such as phase diffraction gratings, phase holograms and the like may also be produced by stamping or embossing a thermoplastic substrate by means of an embossing die, using pressure and heat (Swiss patent specification No. 594,495). Therefore, the synthesis of a surface pattern having an optical diffraction effect could also be effected by numerous phase diffraction elements being strung together by repeated embossing in a thermoplastic substrate. However, this method achieves unsatisfactory results because troublesome beads are produced at the edges of the embossing region between the heated pressure region and the unheated non-pressure area outside the embossing region. In addition, the various embossing regions cannot be fitted together without a joint or seam therebetween, as the high thermal mass of metal embossing dies means that, at the edge of a new embossing region, the edge region of the adjacent old embossing region is necessarily erased.

It is also known from Swiss patent specification No. 594,495 for selectable regions of an embossing die having a microstructure to be reproduced in the thermoplastic layer, by the embossing die being only locally heated or only locally pressed against the thermoplastic substrate. However, that procedure does not produce sharply defined limits between embossed and non-embossed parts.

SUMMARY OF THE INVENTION

It is an object of this invention to provide a method of, and apparatus for, producing a relief pattern with a microscopic structure by selecting small surface regions of an embossing die, having a microstructure, and embossing them on a correspondingly small region of a thermoplastic medium by applying sharply localized heat and pressure to the thermoplastic material.

It is a further object of this invention to make it possible to produce a relief pattern with a microscopic structure economically and conveniently.

It is a further object of the invention to propose a method of, and apparatus for, producing a relief pattern by embossing, in which the embossing edges are sharply delimited, and which is free of troublesome raised bead portions.

The invention comprises pressing a small region of an unheated embossing die against the thermoplastic medium by means of a punch with a substantially spherical face and then applying radiant heat to the thermoplastic medium in the center of the localized region of contact between the medium and the die.

An embossing device to perform the method comprises a punch, a die holder which holds the die slightly spaced from the thermoplastic medium and means for directing concentrated, focussed thermal energy to the region of the thermoplastic medium brought into contact with the die by the punch.

BRIEF DESCRIPTION OF THE DRAWINGS

Embodiments of the invention are described in greater detail hereinafter with reference to the drawings in which:

FIG. 1 is a view showing the basic principle of an apparatus for producing a surface pattern, FIGS. 2 to 4 show various surface patterns, FIG. 5 shows a punch, and FIG. 6 is a view showing the basic principle of an apparatus for scanning a pattern original.

In FIG. 1, which is not drawn to scale, reference numeral 1 denotes a flat, rigid and optically transparent pressure plate. Secured thereto in manner not shown in the drawing is an optically transparent substrate 2. The surface of the substrate 2 which is remote from the pressure plate 1 is coated with a thin layer 3 of thermoplastic, radiation-absorbent material in which a macroscopic surface pattern with a microscopic structure, in particular a structure having an optical diffraction effect, is to be embossed. The layer 3 may comprise for example a plastic film or foil which is black or colored. It may also be formed by coloring the surface of the substrate 2, for example by means of colloidal carbon, in a plastics solution. The typical thickness thereof is from 0.1 to 10 $\mu$m.

Disposed opposite the thermoplastic layer 3 is an unheated embossing die 4 which has a microstructure which is to be reproduced in a region-wise manner. The die 4 comprises, for example, a nickel alloy and advantageously is flexible such that by means of punch 5, it is possible to produce an embossing pressure which is closely calibrated in terms of pressure per unit of surface area, as between the embossing die 4 and the thermoplastic layer 3. The typical thickness of the embossing die is 100 $\mu$m. Advantageously, the punch 5 has a convex surface with a typical radius of curvature of about 7 mm. The punch 5 is pressed against the embossing die 4 by means of a pressure generating means 6, and the embossing die 4 is pressed against the thermoplastic layer in the region of a small contact zone 7, a typical diameter of which is 3 mm. A die holder 8 which is only diagrammatically shown in FIG. 1 holds the embossing die 4 in such a way that it only lies against the thermoplastic layer 3 in the region of the contact zone 7, and elsewhere is slightly spaced therefrom. The die holder 8 is advantageously of such a configuration that the embossing die 4 can be turned in its plane with a small number of simple manual handling operations or, by machine, or can be replaced by another embossing die with a different microstructure when the pressure generating means 6 is in the rest condition.

Disposed on the side of the pressure plate 1 which is remote from the embossing die 4 is a beam source 12 which advantageously comprises a laser 9, an optical modulator 10 and a lens system 11 and which focusses a focussed or concentrated thermal or light beam 13 on a focal spot 14 in the region of the thermoplastic layer 3, which is substantially at the centre of the contact zone 7. Due to absorption of the directly incident beam 13 and the beam reflected at the embossing die 4, the layer 3 is heated in the region of the focal spot 14. The typical diameter of the focal spot 14 is less than 100 μm. The thermal or light beam 13 may be controlled in respect of its energy, or cut in and out, by means of the modulator 10.

The pressure generating means 6 permits displacement of the punch 5 in the z-axis direction which is normal to the surface of the components 1 to 4. Components 1–4 of the apparatus are mounted on a base plate (not shown) in such a way that the pressure plate 1, the substrate 2 with the thermoplastic layer 3 and the embossing die 4 can be displaced, in a continuous or stepwise manner, relative to the focal spot 14 and the punch 5, both along the x-axis and also along the y-axis, that is to say, in a plane parallel to the thermoplastic layer 3. For that purpose, the components 5 and 12 may be arranged to be stationary. It is also possible for the components 1 to 4 and 12 to be stationary and for the beam 13 to be caused to follow the movement of the punch 5 in the x-y-plane by means of a mirror system.

The embossing pressure is so set by means of the pressure generating means 6 that in its cold condition, in the region of the contact zone 7, the thermoplastic layer 3 reacts to the microstructure of the embossing die 4 only with elastic deformation, so that when the embossing pressure is released, it relaxes back into its original condition, that is to say, a smooth surface condition. If, on the other hand, the beam 13 is switched on simultaneously with the application of the embossing pressure, the radiation-absorbent thermoplastic layer 3 is heated above its softening temperature in an approximately circular surface element which is in the focal spot 14 of the source 12, the rise in temperature being such that, in the above-mentioned circular surface element, the surface of the layer 3 is plastically deformed to correspond to the microstructure of the embossing die 4. The embossing pressure is maintained during cooling of the medium so that the embossed structure is retained after cooling, when the embossing pressure is removed. The desired surface pattern is now made up of a multiplicity of such surface elements.

In the stationary writing mode, the beam 13 is only briefly switched on. The heated volume of the thermoplastic layer 3 then quickly cools down by heat conduction into the embossing die 4 and the punch 5 on the one hand, and the layer 3 and the substrate 2 respectively on the other hand. The pressure generating means 6 retracts the punch 5 into the rest position and thus separates the embossing die 4 from the thermoplastic layer 3. The embossed structure is retained in the region of the focal spot 14. This embossing procedure is now successively repeated at other locations on the thermoplastic layer. Between the successive embossing operations, the source 12 is switched off and the embossing pressure is removed, and the substrate 2 with its thermoplastic layer 3 is displaced, relative to the focal spot 14 and the punch 5, in the x-y-plane by a given amount in a given direction. Between the individual embossing operations, the embossing die 4 may be changed or it may be turned by a given amount about the z-axis. In this way, regions of the layer 3 which are isolated from each other or which are jointed together may be provided with any desired microscopic structure.

In the dynamic writing mode, the embossing die 4 and the substrate 2 with the layer 3 are continuously displaced at a given speed relative to the focal spot 14 and the punch 5, with the source 12 switched on and the pressure generating means 6 operating, so that interconnected strip-like surface regions of the microstructure of the die are reproduced on the layer 3.

The relief patterns produced in accordance with the described method may represent geometrical figures, numbers, letters, ornaments, guilloches, etc., whose microscopic structure forms a single one or a plurality of different phase diffraction gratings, phase holograms, kinoforms and the like. Thus it is possible, for example, to produce in the thermoplastic layer, in an economical fashion, a complex network or mesh of twisted and sinuous strips or bands with a microscopic structure having an optical diffraction effect, wherein the microscopic structures change from one strip to another of even vary for example in a quasi-continuous fashion along a strip, so that the human eye sees the effect of guilloche patterns with moving colours. However, the described method may also be used, for example, for producing finely contoured microstructures, as are used in the art of integrated optics.

From the relief pattern produced on the thermoplastic layer 3, it is possible to produce a duplicate in the form of a metal embossing die, using known chemical and galvanic processes, with the embossing die thus produced being used for mass production of the relief pattern in a conventional embossing apparatus.

FIG. 2 shows, as a simple example of a relief pattern which is produced in accordance with the described method, a narrow band or strip which is produced by a single writing movement along the y-axis. The width of the band or strip is approximately equal to or slightly larger than the diameter of the focal spot 14 and is for example 50 μm. The structure of the strip forms, for example, a linear phase diffraction grating with 10 to 2000 lines per millimeter.

By arranging such strips in a row, as shown in FIG. 3, it is possible to produce relief patterns of any desired size, with the microscopic structures of adjacent strips merging into each other without any discontinuity. When a plurality of such strips are disposed in juxtaposed relationship without the embossing die 4 moving relative to the layer 3, a microscopic structure is produced whose structure lines extend continuously over a plurality of strips, as can be seen from FIG. 3.

As shown in FIG. 4, a structure which has been produced can be freshly written over. The old structure is erased if the energy density of the beam is at a sufficiently high level. This simplifies the production of complex structures as, in a first writing operation, it is not necessary to avoid those surface areas which are to be covered with another structure in a subsequent second writing operation.

It is also possible, by precise quantitative control of the energy density of the beam 13 and the speed of writing, for a new structure to be embossed over an old structure, without the old structure being completely erased.

The advantages of the invention are now readily apparent. As already mentioned, very fine line, strip or circular relief patterns and also interconnected surface portions of larger sizes can be provided with microstructures having an optical diffraction effect, without visible jointlines, by producing the microstructures in adjoining relationship or by partially writing one microstructure over another. The structure of the individual surface elements of such relief patterns may be identical or may vary from one element to another. It is also possible to produce microprofiles which cannot be produced by interferometric methods. The edges of the embossed areas are sharply defined and do not have troublesome bead portions. Generally speaking, the described method is the first to afford the possibility of synthesizing finely contoured microstructures, free from being bound to rigid mask systems, wherein the operating procedure can be completely automated by numerical programming and control.

As the embossing pressure is produced by means of the punch 5, exclusively in the region of the focal spot 14, undesired partial cold deformation of the layer 3 due to pressure contact with the embossing die 4, at locations where the microstructure is not to be formed from the embossing die 4, is reduced to minimum duration and frequency, throughout the total embossing time. In addition, the die is more easily changed. Also, in comparison with the prior art in which a pressure is applied over the entire surface, the embossing forces in the invention are substantially lower; this makes it easier to arrive at the mechanical design of the apparatus.

FIG. 5 shows a punch 5' which comprises a ball holder 15 and a ball 16. The ball 16 is disposed with a small amount of clearance in a cylindrical space 17 in the holder 15. The longitudinal axis of the cylindrical space 17 coincides with the z-axis (FIG. 1). A part of the ball 16 projects out of the holder 15 and forms the convex surface of the punch 5'. The space 17 communicates with a compressed air source 20 which acts as the pressure generating means 6', by way of a compressed air conduit 18 and an electromagnetic valve 19.

Increasing the air pressure in the space 17 presses the ball 16 against the embossing die 4 (FIG. 1). The valve 19 can be cycled rapidly so that the air pressure space 17 may be finely varied within wide limits, thereby permitting precise adjustment of the embossing pressure. Automatically cutting off the embossing pressure by means of the valve 19 makes it possible easily to replace, turn or displace the embossing die 4. The fact that the ball 16 is supported by the air cushion at its sides ensures that it encounters negligible resistance to its rolling movement. The leakage air which escapes between the ball 16 and the cylindrical walls of the ball guide member provides for air cooling for the ball 16.

In FIG. 6, reference numeral 21 denotes a surface with a macroscopic pattern 22, which is scanned by an optical-electronic scanning device 23 and reproduced true to scale as a macroscopic pattern with microscopic relief structure on the surface of layer 3 (FIG. 1). A displacement unit 24 guides the scanning device 23 comprising a light source, lens system and light detector (not shown) over the original 21, for example in a line-for-line manner. Synchronously with respect thereto, the focal spot 14 and the punch 5 are displaced relative to the layer 3 and the embossing die 4. In the drawing, that is indicated by a lever system in the form of a pantograph 25 which is moved by the displacement unit 24 and, in being so moved, is rotated about a fixed pivot joint 26. The electrical output of the scanning device 23 is connected by way of an amplifier 27 and a threshold switch 28 to a control input 29 of the modulator 10 of the source 12.

If the local reflectivity of the original 21 exceeds a predetermined value, the modulator 10 is opened so that the microstructure of the embossing die 4 is produced at the corresponding points of the layer 3. In the case of a degree of reflectivity which is below the predetermined value, in contrast, there is neither permanent formation of the microstructure, nor erasure of any structure which has possibly been previously embossed.

The modulator 10 may also be controlled in such a way that embossing does not occur at a high level of reflectivity of the original 21, but at a low level of reflectivity. In addition, the modulator 10 may be actuated in a gradual fashion instead of in a binary fashion, while the dependency of the energy of the beam 3 on the reflectivity of the original 21 may be linear or non-linear. Gradual actuation of the modulator 10 produces modulation of the width of the embossed surface element.

The invention has been described herein with reference to an illustrative embodiment as depicted in the accompanying drawings. Nevertheless, it is understood that the invention is not limited to this precise embodiment, and that various changes and modifications to it can be made by those skilled in the art without departing from the scope and intent of the invention as defined by the following claims.

What is claimed is:

1. A method of embossing a pattern, having a microscopic relief structure of the type which produces an optical diffraction effect, onto the surface of a layer of thermoplastic material comprising the steps of:
   a. placing a flexible embossing die, in the form of a foil, bearing a microscopic relief structure to be reproduced in the thermoplastic layer, in closely-spaced but not touching relationship with said layer of thermoplastic material;
   b. applying an embossing pressure to a small, substantially circular region, of said flexible embossing die, whereby said region of said flexible embossing die is brought into embossing contact with a correspondingly small, substantially circular region of said thermoplastic layer;
   c. placing a radiant source of thermal energy so that said thermoplastic layer is between said flexible embossing die and said radiant source of thermal energy;
   d. focussing said thermal energy onto a focal spot in the region of said thermoplastic layer which is in embossing contact with said flexible embossing die, thereby causing said region of said thermoplastic layer to heat up and soften;

e. interrupting said thermal energy, whereby said small substantially circular region of said thermoplastic layer is allowed to cool and harden, thereby fixing said microscopic relief structure in said small, substantially circular region of said thermoplastic layer;

f. removing said embossing pressure from said small, substantially circular region of said flexible embossing die, whereby embossing contact with said small substantially circular region of said thermoplastic layer is ended; and g. repeating above steps as many times and in as many regions of said thermoplastic layer as is required to form the desired pattern.

2. The method as recited in claim 1, wherein said embossing pressure is applied only in the region of said focal spot.

3. The method as recited in claim 2, wherein said embossing pressure is applied in said region of said focal spot by means of a punch having a convex surface.

4. A method according to claim 1 wherein interconnected strip-like regions, of said microscopic relief structure of said flexible embossing die, are formed in said thermoplastic layer by continuously displacing said flexible embossing die and said thermoplastic layer relative to said focal spot.

5. A method as recited in claim 1, wherein said thermoplastic layer is repositioned, relative to said focal spot when said beams of thermal energy are interrupted and when said embossing pressure is removed.

6. A method according to claim 5 wherein said flexible embossing die is turned or replaced, during said repositioning.

7. A method according to claim 1 wherein a pattern original is scanned by means of an optical-electronic scanning device, and synchronously with respect thereto said flexible embossing die and said thermoplastic layer are displaced relative to said focal spot and said radiant source is controlled in dependence on the output signal of said scanning device.

8. A method of embossing a pattern, having a microscopic relief structure of the type which produces an optical diffraction effect, onto the surface of a substrate covered with a layer of radiant energy absorbing thermoplastic material comprising the steps of:

(a) placing a flexible embossing die, in the form of a foil, bearing a microscopic relief structure to be reproduced in the thermoplastic layer, in closely-spaced but not touching relationship with said layer of thermoplastic material;

(b) applying pressure to said embossing die, whereby said flexible embossing die is brought into contact with said thermoplastic layer and an elastic deformation occurs;

(c) placing a radiant source of thermal energy so that said thermoplastic layer is between said flexible embossing die and said radiant source of thermal energy;

(d) focussing said thermal energy through said transparent pressure plate and substrate in a small region of said radiation absorbent thermoplastic layer which is in contact with said flexible embossing die, thereby causing said region of said thermoplastic layer to heat up, soften and to be plastically deformed;

(e) interrupting said thermal energy, whereby said small region of said thermoplastic layer is allowed to cool and harden, thereby fixing said microscopic relief structure in the form of an approximately circular surface region of said thermoplastic layer;

(f) removing pressure from said flexible embossing die, whereby contact with said small substantially circular region of said thermoplastic layer is ended; and (g) repeating steps d and e as many times and in as many regions of said thermoplastic layer as is required to form the desired pattern.

9. A method according to claim 8, wherein interconnected strip-like regions of said microscopic relief structure of said flexible embossing die are formed in said thermoplastic layer by continuously displacing said flexible embossing die and said thermoplastic layer relative to said focal spot.

10. A method according to claim 8, wherein said thermoplastic layer is displaced in a stepwise manner relative to said focal spot when said beams of thermal energy are interrupted and when said pressure is removed.

11. A method according to claim 10, wherein said flexible embossing die is turned or replaced during said stepwise displacement.

12. A method according to claim 8, wherein a pattern original is scanned by means an optical-electronic scanning device, and synchronously with respect thereto said flexible embossing die and said thermoplastic layer are displaced relative to said focal spot and said radiation energy beam source is controlled according to the output signal of said scanning device.

13. An apparatus for embossing a pattern having a microscopic relief structure of the type which produces an optical diffraction effect, onto the surface of a substrate covered with a layer of radiant energy absorbing thermoplastic material, said apparatus comprising a flat, rigid and optically transparent pressure plate capable of supporting said substrate and said radiant energy absorbing thermoplastic layer, a flexible embossing die spaced apart from said pressure plate for receiving said substrate, said embossing die being capable of being placed on said thermoplastic layer of said substrate, but not in embossing contact with said thermoplastic layer, a punch located on the other side of said flexible embossing die from said substrate, a radiant energy beam source located on the other side of said pressure plate from said substrate, focussing means located between said radiant energy beam source and said pressure plate capable of producing a focal spot of said beam source on said substrate, said focal spot heating a circular surface element of said thermoplastic layer on said substrate, said punch having a convex surface and being capable of being positioned so as to produce through said embossing die an embossing pressure only in the region of said focal spot onto said thermoplastic layer, said embossing die and said substrate with said thermoplastic layer being capable of being displaced, in a plane parallel to said thermoplastic layer, relative to said focal spot and said punch.

14. An apparatus according to claim 13 wherein said punch includes a ballholder defining a cylindrical chamber and a ball which is capable of a freely rolling movement in said cylindrical chamber, of projecting partly out of said chamber and of acting as a piston in said chamber, the ballholder being capable of guiding the ball towards the embossing die, of exerting a force upon the embossing die and of building up the embossing pressure by the air pressure built up in said chamber behind the ball by means of a controlled inflow of compressed air and of the leakage of air between the ball and the wall of said chamber.

15. The apparatus of claim 13, wherein said apparatus further comprises
an optical electrical scanning device, and
displacement means for guiding asid scanning device over a pattern original for synchronously displacing said embossing die and said thermoplastic layer relative to said focal spot and said punch,
said scanning device having an electrical output connected to a control input of said beam source.

16. An apparatus for embossing a pattern having microscopic relief structure of the type which produces an optical diffraction effect onto the surface of a substrate covered with radiant energy absorbing thermoplastic material, said apparatus comprising a flat, rigid optically transparent pressure plate capable of supporting said substrate with a radiant-energy absorbing thermoplastic layer, a flexible embossing die spaced apart from said pressure plate by said substrate and capable of being positioned on said thermoplastic layer of said substrate, a punch located on the other side of said flexible embossing die from said substrate being capable of pressing the flexible embossing die onto said thermoplastic layer so that only an elastic deformation on the surface of said thermoplastic layer occurs, a radiation energy beam source located on the other side of said pressure plate from said substrate, focussing means located between said radiation-energy beam source and said pressure plate capable of concentrating the energy of said beam source in a focal spot through the pressure plate on through said substrate in said thermoplastic layer and heating a small region of thermoplastic layer on said substrate so that said thermoplastic layer softens and yields to said embossing die under the pressure of said punch by a plastic deformation, whereby the embossing occurs only in the region of said focal spot, said flexible embossing die and said substrate with said thermoplastic layer capable of being displaced in a plane parallel to said thermoplastic layer relative to said focal spot and said punch.

* * * * *